(12) United States Patent
Dayan et al.

(10) Patent No.: US 7,616,217 B2
(45) Date of Patent: Nov. 10, 2009

(54) DYNAMIC EXPLORATION OF ELECTRONIC MAPS

(75) Inventors: Tal Dayan, Los Gatos, CA (US); Max Ross, Mountain View, CA (US)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 11/380,304

(22) Filed: Apr. 26, 2006

(65) Prior Publication Data

US 2008/0059205 A1    Mar. 6, 2008

(51) Int. Cl.
*G09G 5/02* (2006.01)
*G09G 5/00* (2006.01)
*G06Q 10/00* (2006.01)
*G06Q 30/00* (2006.01)
*G06K 9/40* (2006.01)

(52) U.S. Cl. .................. 345/619; 345/581; 345/586; 345/643; 382/199; 382/217; 702/94; 702/158

(58) Field of Classification Search .......... 345/581, 345/586, 619, 643, 440, 468, 548, 553; 382/189, 382/199, 201, 205, 206, 209, 217, 300; 715/200, 715/733; 702/189, 127, 155–158, 94–97
See application file for complete search history.

(56) References Cited

U.S. PATENT DOCUMENTS

| | | | | |
|---|---|---|---|---|
| 2002/0184043 A1* | 12/2002 | Lavorgna et al. | ............... | 705/1 |
| 2003/0194057 A1* | 10/2003 | Dewaele | ................. | 378/210 |
| 2004/0027258 A1* | 2/2004 | Pechatnikov et al. | ..... | 340/995.1 |
| 2004/0122936 A1* | 6/2004 | Mizelle et al. | ............... | 709/224 |
| 2005/0033511 A1* | 2/2005 | Pechatnikov et al. | ........ | 701/210 |
| 2005/0144592 A1* | 6/2005 | Below et al. | ................... | 717/124 |
| 2005/0209944 A1* | 9/2005 | Ballow et al. | ................. | 705/35 |
| 2005/0232513 A1* | 10/2005 | Ritt et al. | .................... | 382/294 |
| 2006/0026067 A1* | 2/2006 | Nicholas et al. | ............... | 705/14 |
| 2006/0080156 A1* | 4/2006 | Baughn et al. | ................. | 705/7 |
| 2007/0116357 A1* | 5/2007 | Dewaele | ..................... | 382/173 |
| 2007/0149214 A1* | 6/2007 | Walsh et al. | ............. | 455/456.1 |
| 2007/0225986 A1* | 9/2007 | Bowe et al. | .................... | 705/1 |
| 2008/0234752 A1* | 9/2008 | Dahners | ..................... | 606/291 |
| 2008/0288306 A1* | 11/2008 | MacIntyre et al. | ............. | 705/7 |
| 2008/0313532 A1* | 12/2008 | Dames et al. | ............... | 715/239 |

OTHER PUBLICATIONS

Bedard, Y., et al., "Supporting Multiple Representations with Spatial Databases Views Management and the Concept of 'VUEL,'" Joint Workshop on Multi-Scale Representations of Spatial Data, Jul. 7-8, 2002, pp. 1-14, ISPRS WG IV/3, ICA Com. on Map Generation, Ottawa, Canada.

Bernier, E., et al., "UMapIT: An On-Demand Web Mapping Tool Based on a Multiple Representation Database," Eighth ICA Workshop on Generalisation and Multiple Representation, Jul. 7-8, 2005, pp. 1-9, A Coruña, Spain.

(Continued)

*Primary Examiner*—Wesner Sajous
(74) *Attorney, Agent, or Firm*—Fenwick & West LLP

(57) ABSTRACT

A mapping engine receives map data from a map server and displays electronic maps. The mapping engine also receives one or more templates that specify metrics to show with the map. The templates specify metrics to accomplish specific tasks, such as house hunting. Metrics describe attributes of the areas shown in the map and are received from a metrics server or another source. Metrics are static or dynamic. Some metrics are explicitly specified, while other metrics are computed in response to the map data and/or other metrics. One or more of the templates are designated as "active," and the mapping engine displays the metrics of the active templates. The mapping engine displays some metrics on the map and other metrics in a metrics panel.

43 Claims, 6 Drawing Sheets

OTHER PUBLICATIONS

Ester, M., et al., "Spatial Data Mining: A Database Approach," Proceedings of the Fifth International Symposium on Large Spatial Databases (SSD '97), 1997, 20 pages, Lecture Notes in Computer Science, Springer, Berlin, Germany.

"Information Visualization: Visual Interfaces for Decision Support Systems," AVS Advanced Visual Systems, [online] [Retrieved on Aug. 28, 2006] Retrieved from the InternetURL:http://www.avs.com/white-papers/infoviz.html, undated.

Poslad, S., et al., "Crumpet: Creation of User-Friendly Mobile Services Personalized for Tourism," Second International Conference on 3G Mobile Communication Technologies, 3G 2001, Mar. 2001, 5 pages, London, UK.

Zhou, X., et al., "On Spatial Information Retrieval an Database Generalization," International Conference on Digital Libraries: Research and Practice, 2000, pp. 328-334, IEEE, Kyoto, Japan.

Egenhofer, M., et al., "Exploratory Access to Geographic Data Based on the Map-Overlay Metaphor," Journal of Visual Languages and Computing, 1993, p. 105-125, vol. 4, No. 2.

Egenhofer, M., et al., "Visual Map-Algebra: a direct -manipulation user interface for GIS," Visual Database Systems 3, Visual Information Management, Proceedings of the Third IFIP 2.6 Working Conference on Visual Database Systems, Lausanne, Switzerland, Chapman & Hall, 1995, pp. 235-253.

Richards, J., et al., "A Comparison Of Two Direct-Manipulation Gis User Interfaces For Map Overlay," Geographical Systems, 1995, p. 267-290, vol. 2, No. 4.

"Microsoft Streets & Trips 2001," Answers.com, 1999, [online] [Retrieved on May 29, 2009] Retrieved from the internet URL:http://www.answers.com/topic/microsoft-streets-trips-2001>, 2 Pages.

* cited by examiner

DYNAMIC EXPLORATION OF ELECTRONIC MAPS

BACKGROUND OF THE INVENTION

1. Field of the Invention

This invention pertains in general to the visual representation of information and in particular to techniques for displaying information on electronic maps.

2. Description of the Related Art

People use Internet-based electronic maps for a variety of purposes. Initial Internet-based map services allowed people to view street maps for cities and other geographic areas. People often used these services to obtain driving directions. More recent Internet-based services allow people to view more detailed maps. For example, people can now view satellite imagery, topographical data, and 3-D representations of buildings and other structures on maps. As a result, people now use Internet-based maps for many purposes other than for driving directions, such as for house and job hunting.

Even though there is a wide variety of map data available on the Internet, there are still many types of data that either cannot be viewed on maps, or are not well-represented on the maps. For example, a person hunting for a house might be interested in school districts, average housing prices, average incomes for a neighborhood, driving distances to work or shopping, etc. This information is often available on the Internet but cannot be viewed on a map.

If the data can be viewed on a map, the data are often displayed in a manner that reduces the effectiveness of the map. For example, one way to show school districts on a map is to present a static overlay that illustrates the district boundaries. Similarly, average housing prices can be shown by shading regions of the map with different colors representing the prices. A difficulty with representing data in this way is that the map quickly becomes cluttered with too much information and becomes difficult to comprehend.

Therefore, there is a need in the art for a way to display multiple types of data on a map without making the map difficult to comprehend.

BRIEF SUMMARY OF THE INVENTION

The above need is met by enabling interactive exploration of a dynamic map through the use of templates that display metrics using a variety of techniques. In one embodiment, a mapping engine displays an electronic map on a display device. The mapping engine includes a template module for receiving a template, the template specifying one or more metrics to display on the electronic map and specifying at least one computed metric that is generated from other metrics, a metric computation module for determining the computed metric specified by the template, and a rendering module for displaying the electronic map and the computed metric specified by the template on the display device.

In one embodiment, a system for enabling dynamic exploration of an interactive map comprises a metrics data storage module storing metrics describing mapped regions, a template storage module storing templates, each template identifying a set of metrics to display if the template is active, and a communications module receiving requests for certain metrics and providing the metrics in response, and receiving requests for templates and providing the templates in response.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Overview

Figure 1:
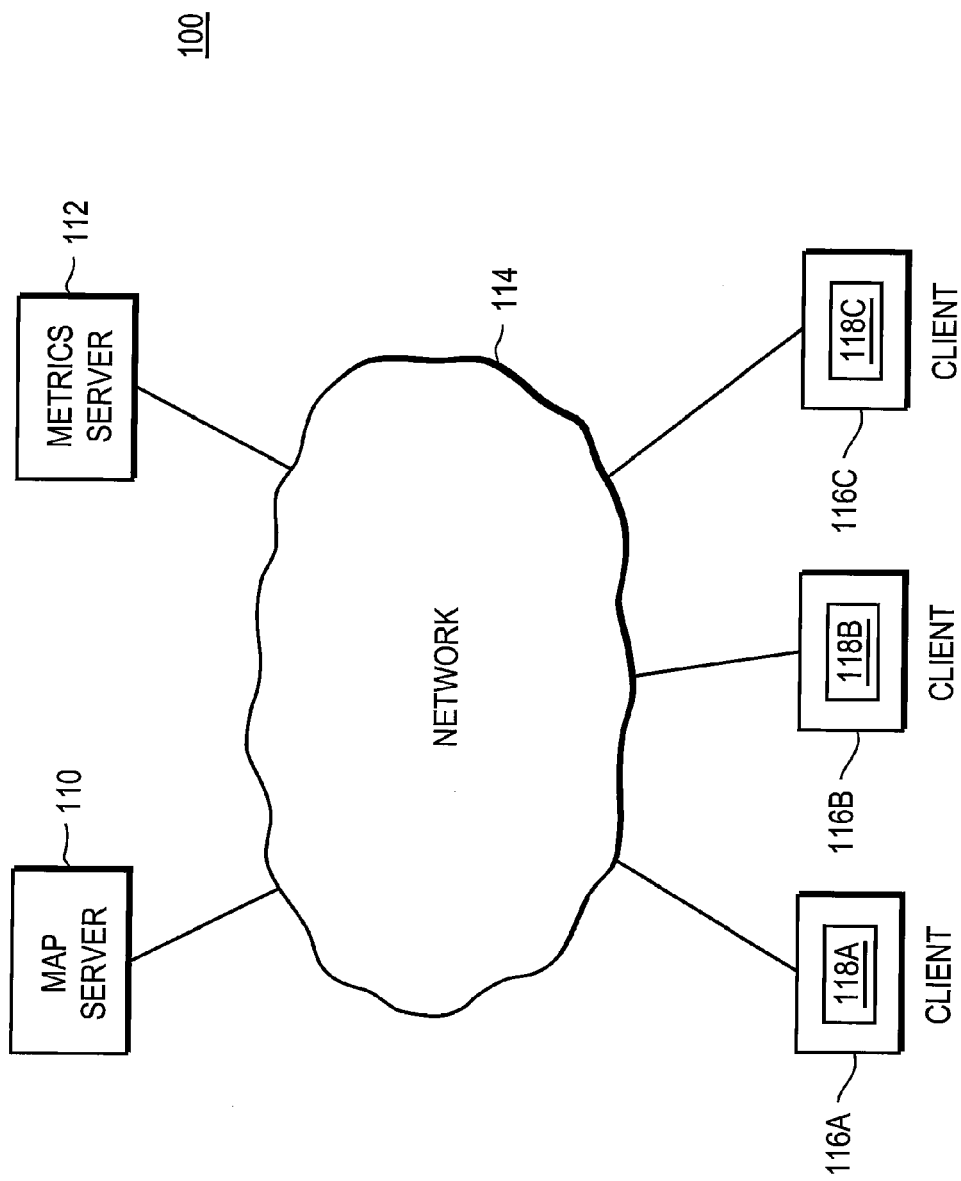
FIG. 1 is a high-level block diagram of a computing environment for providing maps and related data according to one embodiment.

FIG. 1 is a high-level block diagram of a computing environment 100 for providing maps and related data according to one embodiment. The illustrated environment contains a map server 110 and a metric server 112 coupled to a network 114. Multiple clients 116 having mapping engines 118 are also coupled to the network 114. Generally, the mapping engines 118 display maps from the map server 110 and metrics from the metrics server 112. The mapping engines 118 receive templates from the metrics server 112 and/or another entity that specify how to display certain metrics on the map. The templates and metrics are highly-customizable, which allows end-users to view metrics in a manner that maximizes comprehension of the map.

FIG. 1 and the other figures use like reference numerals to identify like elements. A letter after a reference numeral, such as "116A," indicates that the text refers specifically to the element having that particular reference numeral. A reference numeral in the text without a following letter, such as "116," refers to any or all of the elements in the figures bearing that reference numeral (e.g. "116" in the text refers to reference numerals "110A," "110B," and/or "110C" in the figures).

The map server 110 stores and provides data for generating maps. In one embodiment, the map data describe geographic regions, such places on the Earth, Moon, or elsewhere in the solar system, and/or fictional locations. The map data include data such as geographic and political boundaries, topographical data, image data (e.g., satellite imagery), street and address data, data describing geographic features and buildings, and/or other types of data. In one embodiment, the map server 110 provides subsets of the map data in response to queries for data received via the network 114. For example, the map server 110 can receive a query asking for a certain type of satellite imagery centered on a specified latitude/ longitude and provide the requested data in response. In one embodiment, the map server 110 provides image data that illustrate the map. In another embodiment, the map server 110 provides raw data that a requestor can use to create a map.

A metrics server 112 stores and provides metrics data describing metrics for the geographic regions described by the map data. The metrics data are static or dynamic and generally describe attributes of the map data. These attributes can include statistical and/or demographic information. For example, the map data can describe the streets of a city while the metric data describe traffic congestion on the streets. Likewise, the metrics data can describe weather conditions, political boundaries and other locations not contained in the map data, such as school districts, locations of businesses and public transportation, etc. Many different types of metrics data are described below, and different embodiments of the metrics server 112 can provide different metrics data. In some embodiments, the map server 110 and metrics server 112 are combined.

In one embodiment, the metrics server 112 stores and provides a set of templates describing what metrics to display on a map and how to display them. A template identifies one or more metrics and, for each metric, states one of a variety of different techniques to use to represent the metric on the map. For example, a template can identify a crime rate metric, and state that the crime rate for a given region on a map should be described using a numeric value between 1 and 10. Likewise, a template can specify a location on a map and state that the distance from the center of the currently-displayed map to the location be represented using a vector arrow. Another template can combine the two metrics and techniques described above, e.g. display both the crime rate and distance to the specified location.

In one embodiment, at least some metrics data and/or templates stored by the metrics server 112 are provided by end-users of the clients 116. Additionally, in some embodiments there are multiple metrics servers 112. For example, a metrics server 112 can be dedicated to providing certain types of metrics, such as environmental data or data describing public schools. In one embodiment, at least some templates are provided by a server other than the metrics server 112, such as a dedicated template server or a third party server.

A client 116 is a computer utilized by an end-user to communicate with the map server 110, metrics server 112, and/or other computers on the network 114. The computer, for example, is a personal computer executing a web browser such as MICROSOFT INTERNET EXPLORER or MOZILLA FIREFOX, that allows the end-user to retrieve and display content from web servers and other computers on the network 114. In other embodiments, the client 116 is a network-capable device other than a personal computer, such as a personal digital assistant (PDA), a cellular telephone, a pager, an in-vehicle navigation system, a television "set-top box" etc. Although FIG. 1 illustrates three clients 116, embodiments of the present invention can have thousands or millions of clients.

In one embodiment, the client executes a mapping engine 118 that provides an end-user with the ability to specify a geographic location and obtain a map for the location from the map server 110. In addition, the end-user specifies one or more active templates for displaying metrics on the map by selecting a template stored by the metrics server 112 or creating a custom template. The mapping engine 118 displays the map, and displays metrics data from the metrics server 112 as specified by the active template. In one embodiment, the end-user uses the mapping engine 118 to specify metrics data and optionally send the metrics data to the metrics server 112 from where it can be utilized by other end-users. Similarly, in one embodiment the end-user sends custom templates to the metrics server 112 from where the templates can be utilized by other end-users.

The network 114 represents the communication pathways between the map server 110, metrics server 112, and clients 116. In one embodiment, the network 114 is the Internet. The network 114 can also utilize dedicated or private communications links that are not necessarily part of the Internet. In one embodiment, the network 114 carries traffic using standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used by traffic on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
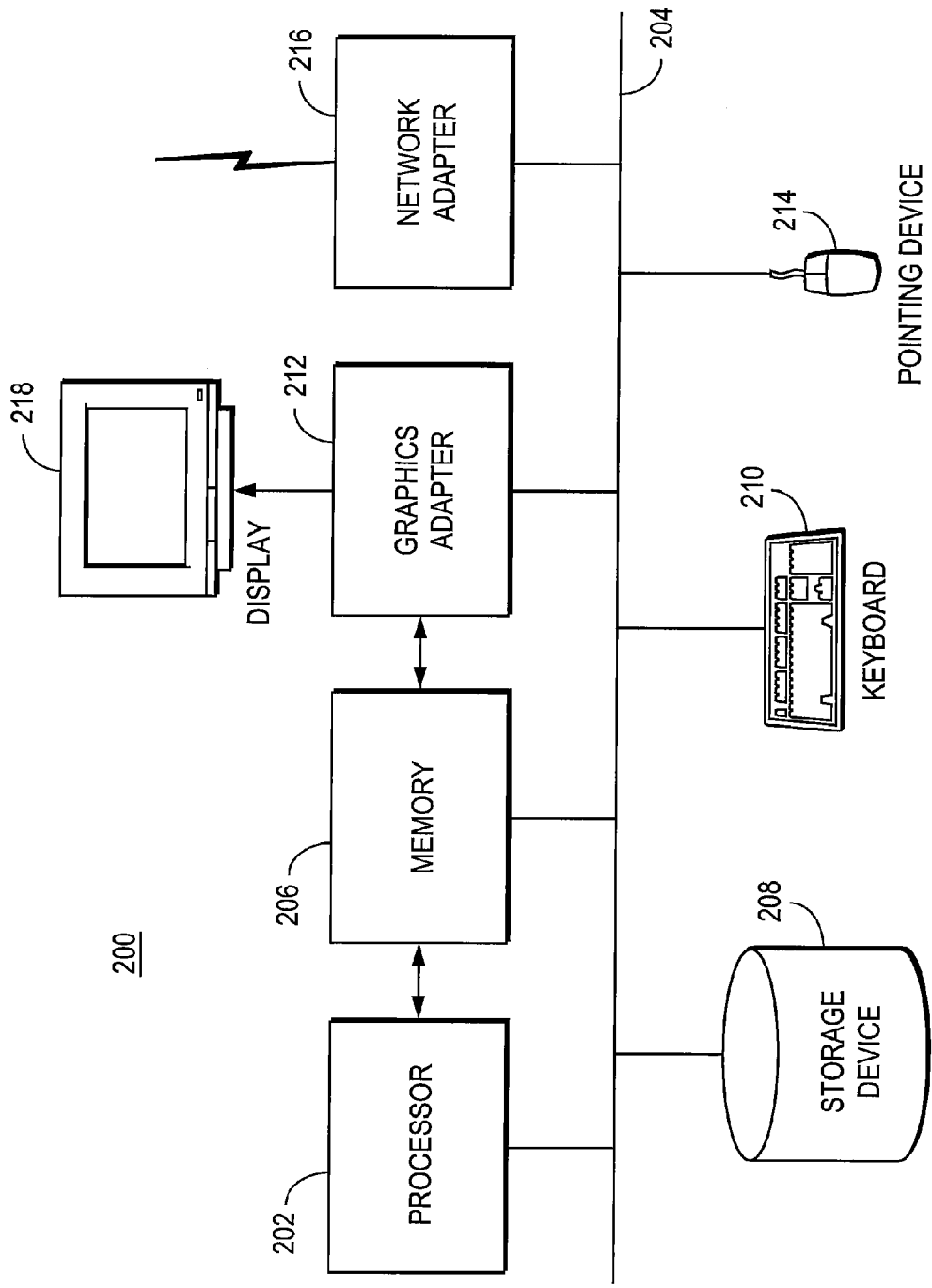
FIG. 2 is a high-level block diagram illustrating a functional view of a computer for use as one of the entities illustrated in the environment of FIG. 1 according to one embodiment.

FIG. 2 is a high-level block diagram illustrating a functional view of a computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display device 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display device 218. The display device 218 is, for example, a LCD panel, a projector, a heads-up display for a vehicle, and/or a pair of virtual reality goggles. The network adapter 216 couples the computer 200 to the network 114.

The types of computers 200 utilized by the entities of FIG. 1 can vary depending upon the embodiment and the processing power required by the entity. A map server 110 and/or metrics server 112 might be provided by a web server running on a powerful computer system comprising one or more blade servers operating in tandem. In contrast, a client 116 might contain a single processor 202 and have a relatively small storage device 208. In many instances the computer lacks one or more of the elements shown in FIG. 2, such as a keyboard 210, pointing device 214, graphics adaptor 212, and/or display device 218.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

Figure 3:
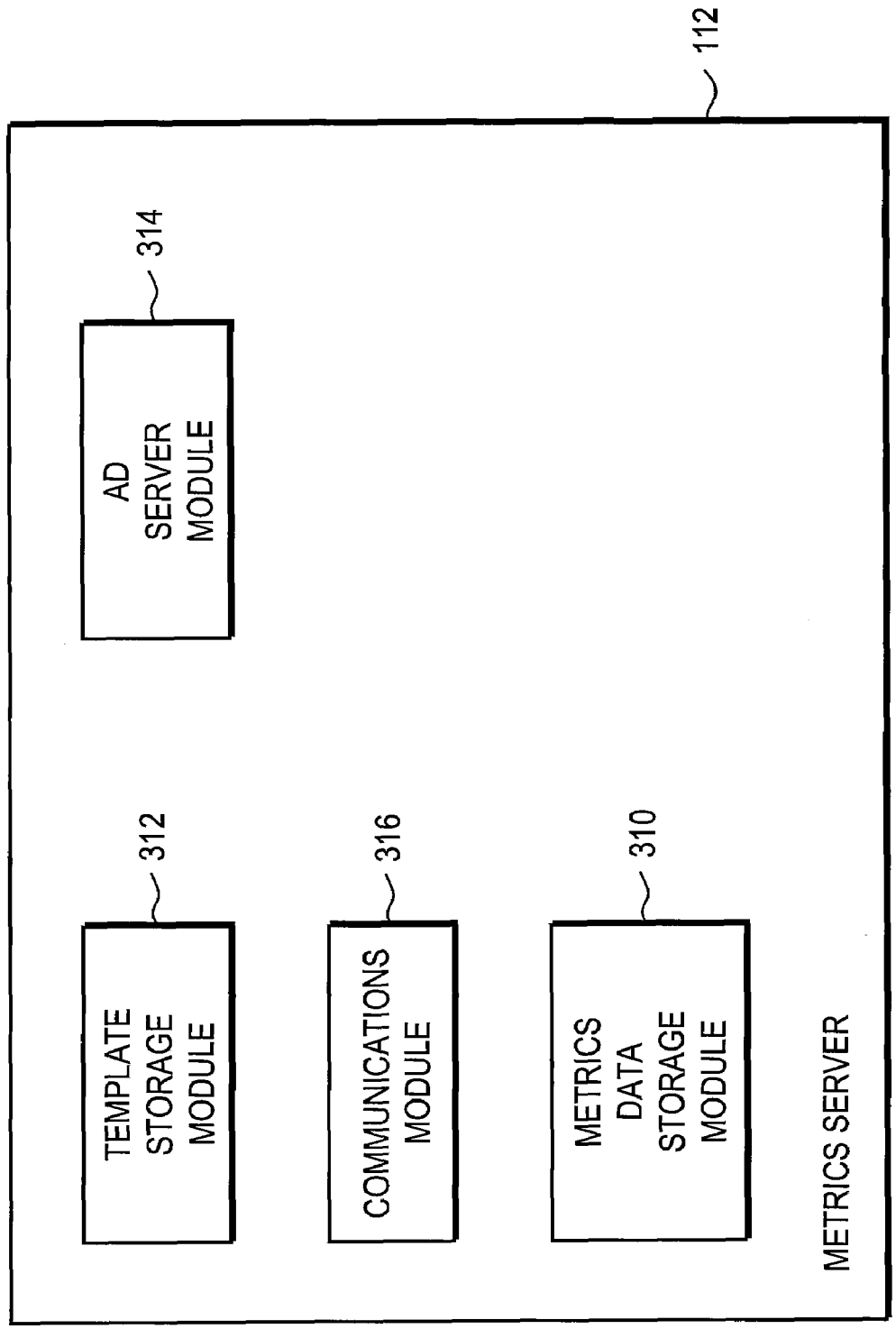
FIG. 3 is a high-level block diagram illustrating modules within the metrics server according to one embodiment.

FIG. 3 is a high-level block diagram illustrating modules within the metrics server 112 according to one embodiment. Other embodiments have different and/or additional modules than the ones shown in the figure. In addition, other embodiments distribute the functionalities among the modules in a different manner. Further, in some embodiments functionalities attributed to the metrics server 112 are performed by other entities such as the map server 110 and/or the clients 116.

A metrics data storage module 310 stores data describing attributes of the areas on the maps produced by the map server 110 (i.e., "metrics"). As mentioned above, the types of metrics data stored by the storage module 310 can vary depending upon the embodiment. Metrics data can include, for example, demographic, psychographic, and/or other statistical data describing a population of a region, boundary data describing governmental and quasi-governmental boundaries, cost information describing costs of living, real estate values, and fuel costs, traffic and weather data describing traffic congestion, average temperatures, and air quality, location data describing locations of entities such as offices, commercial centers, schools, religious facilities, hospitals and public transportation, and miscellaneous information describing attributes like average noise, locations of registered sexual offenders, whether ocean views are available from a location etc. Other embodiments store different and/or additional metrics data.

Some metrics are static while others are dynamic. For example, certain metrics, like locations of schools, change infrequently and can be considered static. Other metrics, like current traffic congestion on a road, are dynamic and may change frequently.

In addition, some metrics are explicitly described by the metrics data, while some metrics are computed from other metrics. Explicit metrics are metrics that are used in their current form. For example, the metrics data may explicitly specify locations of schools and businesses, home values, and crime rates within a region.

Computed metrics, in contrast, are derived from other explicit and/or computed metrics. For example, the cost of traveling between two points may be computed based on the distance between the points, average fuel costs for the region, and current or historical traffic congestion. Likewise, the average housing prices for a city may be calculated from average prices of smaller units (e.g., ZIP codes) that are explicitly described by other metrics, and whether a location has ocean views may be calculated based on the distance to an ocean, topographical data, and/or data describing the heights of adjacent buildings. These computed metrics are derived by applying functions to other metrics. Similarly, some computed metrics are based on whether conditions are satisfied by one or more other metrics. For example, a metric can indicate whether an area is within five minutes walking distance of a school, within a 10 minute drive to a commercial district, and has average home processes of less than $500K. In some embodiments, computed metrics are not stored by the metrics data storage module 310 but rather are computed in real time by the mapping engines 118.

In one embodiment, at least some of the metrics data stored by the storage module 310 are derived from information accessible on the network 114. Certain types of information, such as demographic and weather information, are widely available on the World Wide Web and via other network-accessible electronic documents. Some metrics data stored by the storage module 310 are provided by commercial data providers and might not be publicly-accessible. Other metrics data stored by the storage module 310 are provided by end-users of the clients 116. For example, noise data describing the average noise of a geographic location can be submitted by an end-user familiar with the location.

A template storage module 312 stores templates describing what metrics to display on a map. That is, a template describes one or more metrics to include on a map when the template is applied to the map. A template describes a computed metric by specifying how to derive the metric from other metrics. For example, a template can indicate that explicit school district boundaries are shown on maps viewed using the template, and that the distance from the center of the map to the nearest school is also shown. In one embodiment, the template further describes how the metric is to be displayed. For example, the metric can be displayed as a raw number, as a vector arrow on the map, as a bar graph, as images or 3-D models, etc. In one embodiment, each template in the template storage module 312 is identified by a name or other unique identifier. In an embodiment where there are multiple metrics servers 112, a template specifies the network address of the server that provide the metrics data.

In one embodiment, the templates in the storage module 312 are designed for pre-specified tasks. For example, a "home finding" template is designed to assist an end-user in shopping for a new house and references metrics geared to that task. These metrics include, for example, average real estate prices, average education levels, crime rates, distances to locations like commercial districts, schools, and workplaces, noise levels, etc. Other tasks for which templates may exist include vacation planning, job searching, school searching, etc.

In one embodiment, the templates in the template storage module 312 are created by an administrator and/or other person associated with the metrics server 112 and/or map sever 110. For example, engineers associated with the metrics server 112 develop templates for certain tasks and store the templates in the storage module 312. In some embodiments, one or more of the templates are created by end-users of the clients 116. The end-users create templates on the clients 116 by specifying the explicit metrics and/or defining functions for computed metrics and upload the templates to the template storage module 312. Thus, the template storage module 312 stores a variety of templates, some created by the operator of the metrics server 112 and others created by end-users and/or other entities.

In one embodiment, an ad server module 314 serves advertisements and/or other messages to clients. The ads are stored in the ad serving module 314 and/or at another location on the network 114. In one embodiment, the ad server module 314 selects ads based on a template being used by an end-user and/or the metrics presented by the template. For example, if an end-user selects a "house hunting" template, the ad server module 314 serves ads related to real estate, such as ads for real estate agents, mortgage brokers, etc. In another example, if the metrics presented by a template selected by an end-user show average incomes, the ad serving module 314 shows ads for more expensive products when the metrics indicate a high average income and for less expensive products when the metrics indicate a lower average income. Other embodiments of the ad serving module 314 serve ads based on additional and/or different criteria.

A communications module 316 supports communications with the map server 110, clients 116, and/or other entities via the network 114. In one embodiment, the communications module 316 receives communications from the clients 116 including requests for templates and/or requests for metrics data. In response, the communications module 316 provides the templates, data, and/or ads to the requesting clients 116. Similarly, an embodiment of the communications module 316 receives new templates and/or metrics data from the clients 116 and/or other entities and provides these inputs to other modules in the metrics server 112 for processing and/or storage.

Figure 4:
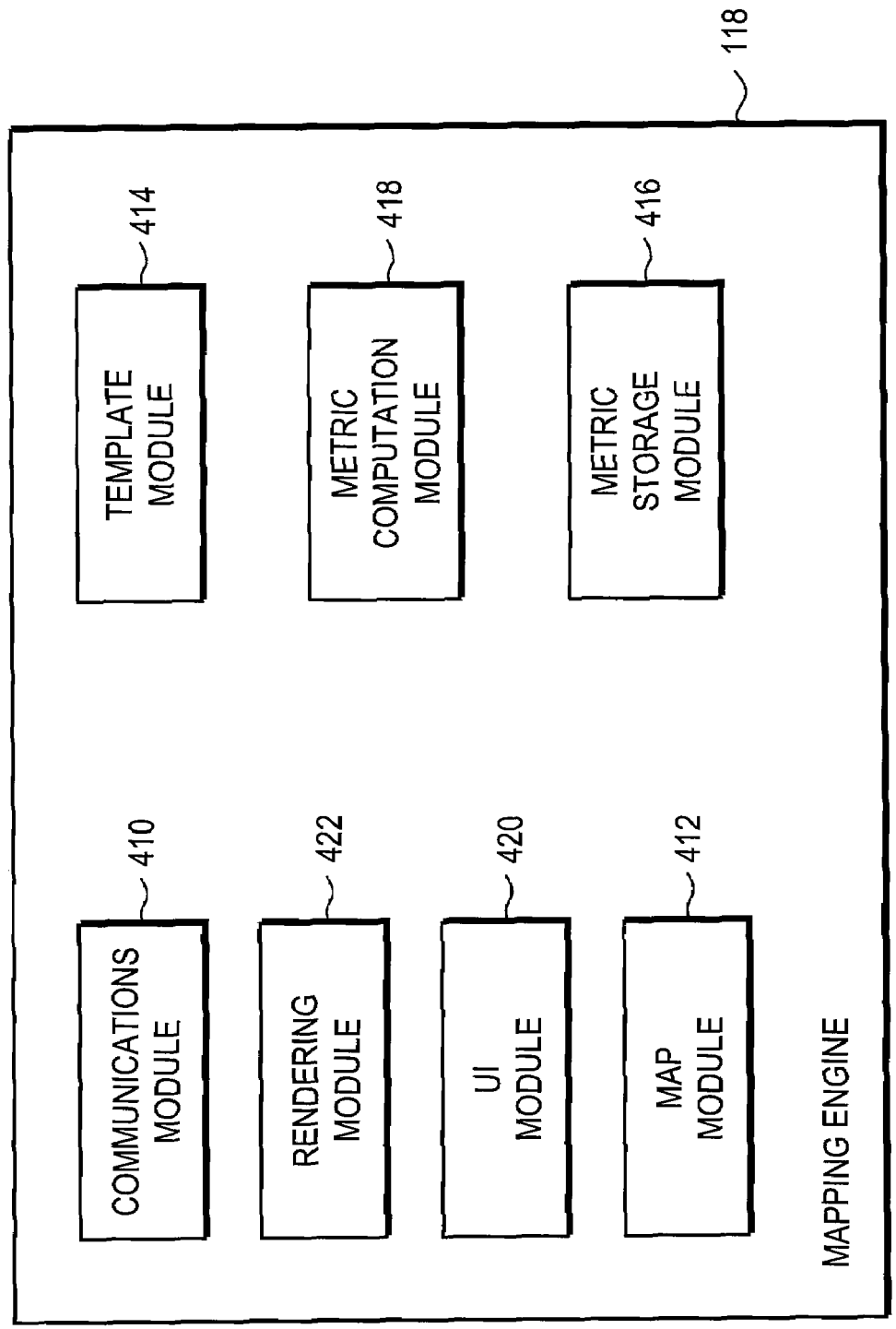
FIG. 4 is a high-level block diagram illustrating modules within the mapping engine according to one embodiment.

FIG. 4 is a high-level block diagram illustrating modules within the mapping engine 118 according to one embodiment. Other embodiments have different and/or additional modules than the ones shown in the figure. In addition, other embodiments distribute the functionalities among the modules in a different manner. Further, in some embodiments functionalities attributed to the mapping engine 118 are performed by other entities on the client 116 and/or elsewhere on the network 114.

In one embodiment, the mapping engine 118 is a standalone application. In another embodiment, the mapping engine 118 is incorporated into another application. For example, the modules can be executed within an execution environment provided by a general purpose web browser.

A communications module 410 supports communications with the map server 110, metrics server 112, and/or other entities via the network 114. In one embodiment, the communications module 410 uses Asynchronous JavaScript and XML (AJAX) to communicate with the map server 110 and/or metrics server 112. This technology allows the communications module 410 to rapidly exchange small amounts of data with the servers and increases the perceived responsiveness of the mapping engine 118 when updating maps, displaying metrics, and/or performing other functions.

In one embodiment, the communications module 410 submits requests to the map server 110 for map data and receives map data in response. Likewise, the communications module 410 submits requests for templates and/or metrics data from the metrics server 112 and receives the requested data in response. The communications module 410 provides received data to the other modules in the mapping engine 118 for subsequent processing. In some embodiments, the communications module 410 provides templates and/or metrics data to the metrics server 112.

A map module 412 requests, receives, and stores map data from the map server 110. The map module 412 provides the map server 110 with a description of a geographic region, such as the name of a city, a latitude/longitude on which the map is centered, a set of coordinates defining a region for which map data are desired, etc. and the map server 110 provides the requested map data. These data are stored by the map module 412 for use by the other modules in the mapping engine 118. In one embodiment, the map module 412 caches the map data for a specified period of time, after which the map data are discarded.

A template module 414 requests, receives, and stores templates. The templates are requested and received from the metrics server 112, another server on the network 114 and/or created by an end-user of the client 116. In one embodiment, one or more templates are designated as "active" by the end-user, meaning that the metrics specified by the template are displayed in combination with a map at the client 116.

A metric storage module 416 stores metrics data received from the metrics server 112 and/or provided by the end-user. In one embodiment, an end-user can provide metrics data and selectively override data received from the metrics server 112. For example, if the end-user is aware that a noise level at a particular location is higher than the data from the metrics server 112 indicate, the end-user can enter a new noise level. The metric storage module 416 stores the user-provided data. In some embodiments, the mapping engine 118 provides the end-user provided data to the metrics server 112, from where it can be shared with other clients 116.

A metric computation module 418 determines values of any computed metrics specified and/or required for a template. In one embodiment, the metric computation module 418 operates in real time. Thus, if a computed metric in an active template is the distance between a fixed location and a variable location, the metric computation module 418 updates the metric in real time as the variable location changes. In one embodiment, the metric computation module 418 searches map and/or metric data to find locations where metrics have certain values. For example, the metric computation module 418 can identify areas within five minutes walking distance to schools that have average home prices below $500K.

A user interface (UI) module 420 enables and controls end-user interactions with the mapping engine 418. In one embodiment, the UI module 420 interacts with the operating system and/or other modules on the client 116 to provide a graphical user interface (GUI) that allows an end-user to use input devices such as keyboards and mice to perform actions such as selecting areas to map, scrolling around the map, and controlling the level of detail (e.g., zoom) of the map. In addition, the GUI allows the end-user to view templates stored by the metrics server 112 and/or the mapping engine 118, and designate one or more templates as "active."

Further, an embodiment of the GUI provided by the UI module 420 allows the end-user to create new templates and modify existing templates by selecting and/or defining metrics to include in the templates. In addition, the UI module 420 allows the end-user to specify parameters of the templates and/or metrics, such as the name of the template and how to represent and display the metric.

Figure 5:
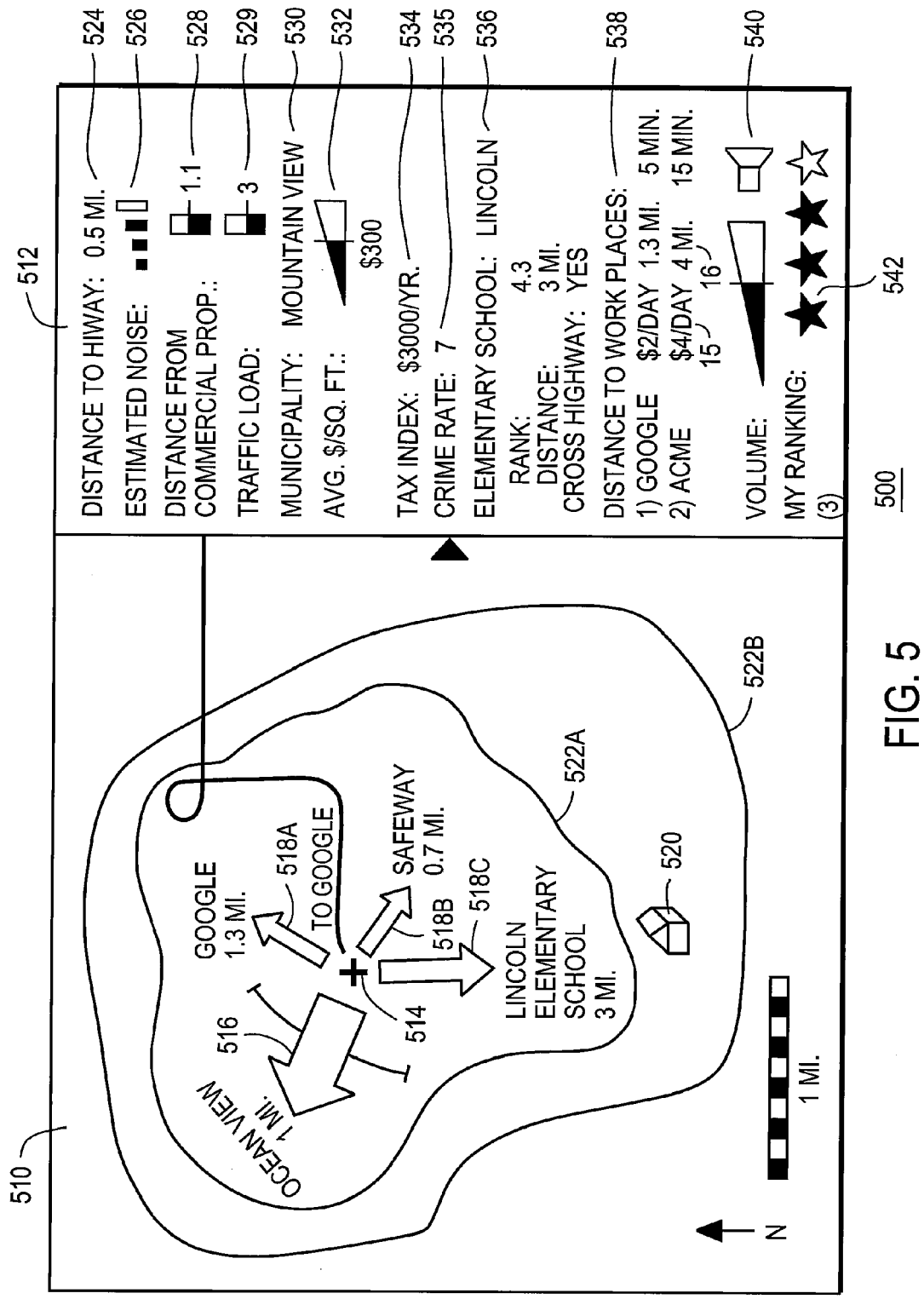
FIG. 5 shows an example of a display produced by the rendering module of the mapping engine according to one embodiment.

A rendering module 422 works in combination with the UI module 420 and/or other modules in the mapping engine 118 to render a display illustrating the map and metrics from the active templates. FIG. 5 shows an example of a display 500 produced by the rendering module 422 according to one embodiment. This display 500 illustrates a map and metrics that are displayed when a "house hunting" template is active. The illustrated map and metrics are merely representative examples, and other embodiments can show different maps and/or metrics.

The display 500 has two primary areas, a map area 510 and a metrics panel 512. Generally, the map area 510 shows the map and any metrics that are configured to appear on the map. The map area 510 includes a reference point 514 on which the metrics are based. In one embodiment, the reference point is a location on the map, such as the center of the displayed region. In another embodiment, the reference point is controlled by the mouse or other input device and can be freely moved on the map by the end-user. The metrics are updated in real time as the reference point changes.

An arrow 516 on the display indicates a direction and distance from the reference point 514 to an ocean view. In this embodiment, the length of the arrow 516 indicates the quality of the view, and the width of an arc associated with the arrow indicates the width of the view. A text label on the map indicates the distance to the view. The ocean view arrow 516 is an example of a computed metric determined by the metric computation module 418 based on other metrics, such as topographical information and building height information.

Three vector arrows 518A-C on the map, indicate the direction and distance to other points on the map. These other points can be directly specified by the end-user and/or template. For example, the end-user can place a point at a potential employer, e.g., "Google" and the arrow 518A represents the direction and distance to the employer from the reference point. The road to the employer is also labeled with "To Google." In addition, the points can be specified indirectly. For example, arrow 518B points to the nearest grocery store, a SAFEWAY, and arrow 518C points to the nearest school 520, Lincoln Elementary School. In one embodiment, these indirectly specified points are updated in real time as the reference point changes.

Two concentric lines 522A-B represent boundaries described in the template. For example, the innermost line 522A defines areas within 5 minutes driving time, and the outermost line defines areas within 10 minutes driving time. Other embodiments represent other and/or different data.

In one embodiment, metrics are displayed as graphical images and/or 3-D models. For example, an end-user can hover the cursor over the location of a house on the map, and cause the display 500 to show an image and/or 3-D model of the house. The image/model can appear in the map area 510, metrics panel 512, and/or elsewhere on the display 500.

The metrics panel 512 displays metrics that are configured to appear in the panel. The illustrated display 500 shows the panel adjacent to the map. In other embodiments, the panel is located at other locations and/or is in a floating window that can be moved and manipulated by the end-user. The metrics panel 512 includes a variety of different metrics. In one embodiment, each computed metric is determined in real time by the metric computation module 418 in response to the current location of the reference point 514. The metric can display its value using one or more of a variety of different representations, including textual, numeric, and graphical representations.

In the illustrated example of the metrics panel 512, a "distance to highway" metric 514 displays the distance to the nearest major highway as a numeric value (0.5 miles in this example). An "estimated noise" metric 526 uses a bar indicator to show the estimated noise at the reference point. Two bar graphs 528, 529 respectively indicate the distance to the nearest commercial property, and the traffic load for nearby roads. A "municipality" text box 530 shows the name of the municipality containing the reference point 514, which in this example is "Mountain View."

An "average price per square foot" metric 532 uses a sliding scale and number to indicate its value, while a "tax index" metric 534 shows the cost per year. A crime rate metric 535 represents its value as a ranking from one to 10. A "nearest elementary school" metric 536 displays multiple sub-metrics for the school 520 displayed in the map 510, including the school's ranking (based on external data and/or end-user defined criteria), the distance to it, and whether one would need to cross a highway when traveling from the reference point 514 to the school.

A "distance to work places" metric 538 displays numeric values indicating the distance to one or more work places defined by the template and/or end-user. In this example, the metric displays the distance to two locations, "Google" and "Acme." A volume control 520 controls the volume of a multimedia metric. The multimedia metric provides audio/visual data to the end-user based on the location of the reference point 514. Finally, a "my ranking" metric 542 uses a graphical indicator (three out of four stars) and a numeric indicator ("3") to rank the designated location using criteria specified by the template and/or end-user. Although not shown in FIG. 5, in one embodiment, the rendering module 422 displays ads received from the ad server module 314 in the map area 510, metric panel 512, and/or elsewhere in the display.

Figure 6:
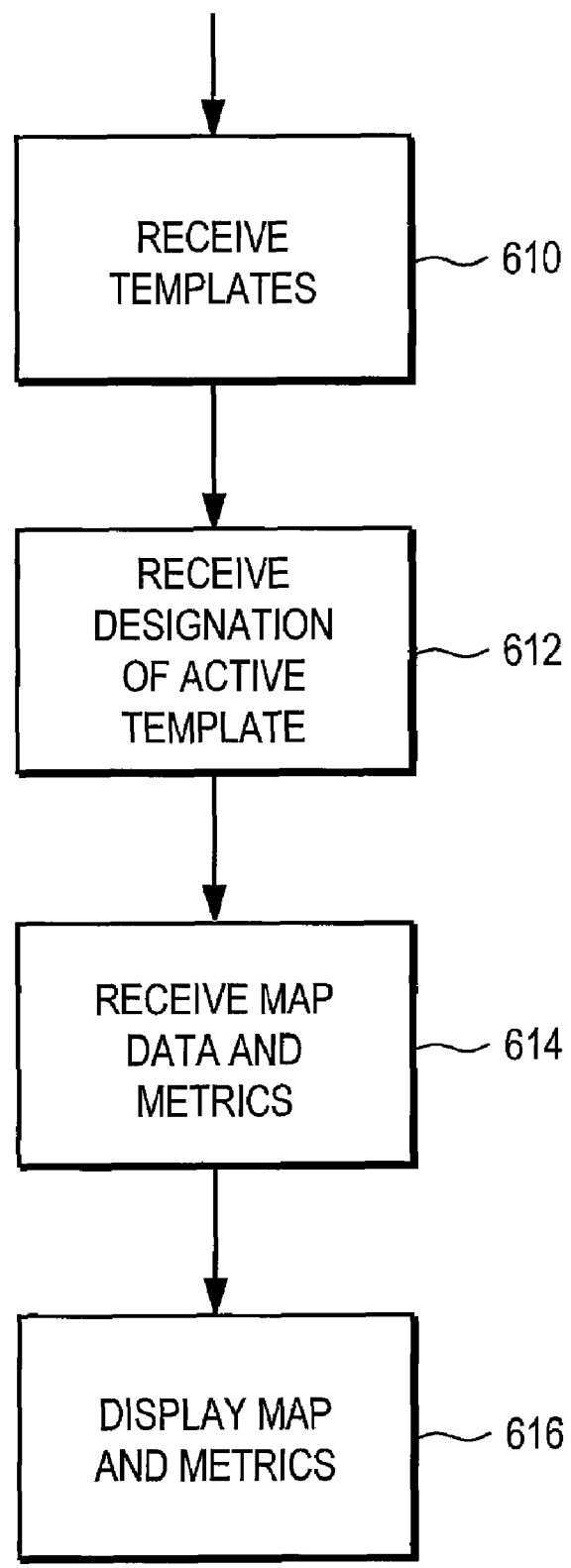
FIG. 6 is a flow chart illustrating steps performed by the mapping engine according to one embodiment.

FIG. 6 is a flow chart illustrating steps performed by the mapping engine 118 according to one embodiment. Different embodiments perform additional and/or different steps. In addition, other embodiments perform the steps in different orders. While FIG. 6 illustrates steps from the perspective of the mapping engine 118, one of skill in the art will recognize that complementary steps are performed by the map server 110, metrics server 112, end-user, and/or other entities.

The mapping engine 118 receives 610 one or more templates. The engine 118 can receive pre-made templates from the metrics server 112 or elsewhere on the network 114. For example, mapping engine 118 can present the end-user with a UI that allows the end-user to select from among the templates stored at the metrics server 112. In addition, the engine 118 can receive the templates as the end-user uses the client 116 to design new templates and/or modify existing templates. In one embodiment, the mapping engine 118 stores the templates for subsequent use.

The mapping engine 118 receives 612 a designation of an active template. For example, the end-user can use the UI to select one or more of the templates stored by the mapping engine 118. The active template specifies one or more metrics to display in combination with a map.

At some point, the end-user (or another entity) utilizes the mapping engine 118 to view a map of a geographic region. As part of this process, the mapping engine 118 receives mapping data from the map server 110. In addition, the mapping engine 118 receives metrics for the region being mapped from the metrics server 112. The metrics received by the mapping engine 118 are specified by the active template.

The mapping engine 118 displays the map and metrics on a display device 218 of the client 116. The metrics are shown relative to a reference point on the map, and, in one embodiment, the metrics change in real time as the reference point changes. The mapping engine 118 determines some computed metrics, such as the location of the nearest school, based on other, metrics and/or map data.

Thus, the mapping engine 118 displays a variety of metrics on a map. An end-user can customize both the metrics and the ways that the metrics are displayed. In this fashion, the end-user can view a variety of data on a map while maintaining a high level of comprehension.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A mapping engine for displaying an electronic map on a display device, comprising:
 a template module for receiving a template, the template specifying one or more metrics to display on the electronic map including at least one computed metric that is generated responsive to other metrics;

a user interface module for receiving user input manipulating the template received by the template module, wherein the manipulations alter the metrics specified by the template;

a metric computation module for determining the computed metric specified by the template and further adapted to determine the computed metric responsive to the manipulations of the template; and a rendering module for displaying the electronic map and the metrics specified by the template on the display device and adapted to update the map and metrics responsive to the manipulations of the template.

2. The mapping engine of claim 1, further comprising:
a map module for receiving map data for the electronic map from a map server via a network.

3. The mapping engine of claim 1, wherein:
the user interface module is adapted to receive user input manipulating the electronic map displayed by the rendering module;

the metric computation module is adapted to determine the computed metric responsive to the manipulations of the electronic map; and wherein the rendering module is adapted to update the map and metrics displayed on the display device responsive to the manipulations of the electronic map.

4. The mapping engine of claim 1, further comprising:
a communications module adapted to provide the manipulated template to a server via a network.

5. The mapping engine of claim 1, wherein the template module is adapted to store a plurality of templates, the templates specifying different metrics to display on the map, one or more of the templates are designated as active, the metric computation module is adapted to determine computed metrics specified by the active templates, and the rendering module is adapted to display the metrics specified by the active templates.

6. The mapping engine of claim 1, further comprising:
a metric module for receiving the metrics from a metrics server via a network.

7. The mapping engine of claim 6, wherein the mapping engine is adapted to execute on a computer, and wherein the metric module is adapted to receive a metric from an end-user of the computer.

8. The mapping engine of claim 7, further comprising:
a communications module adapted to provide the metric received from the end-user to the metrics server via the network.

9. The mapping engine of claim 1, wherein the template further specifies how to display a metric and wherein the rendering module displays the metric on the electronic map as specified by the template.

10. The mapping engine of claim 9, wherein the rendering module is further adapted to display a map area and a metrics panel on the display device, and to selectively display the metrics in the map area and/or the metrics panel as specified by the template.

11. A computer program product having a computer-readable medium having computer program logic embodied therein for displaying an electronic map on a display device, the computer program logic comprising:
a template module for receiving a template, the template specifying one or more metrics to display on the electronic map including at least one computed metric that is generated responsive to other metrics;

a user interface module for receiving user input manipulating the template received by the template module, wherein the manipulations alter the metrics specified by the template;

a metric computation module for determining the computed metric specified by the template and further adapted to determine the computed metric responsive to the manipulations of the template; and a rendering module for displaying the electronic map and the metrics specified by the template on the display device and adapted to update the map and metrics responsive to the manipulations of the template.

12. The computer program product of claim 11, further comprising:
a map module for receiving map data for the electronic map from a map sewer via a network.

13. The computer program product of claim 11, further comprising:
a metric module for receiving the metrics from a metrics server via a network.

14. The computer program product of claim 11, wherein:
the user interface module for receiving user input manipulating the electronic map displayed by the rendering module;

the metric computation module is adapted to dynamically determine the computed metric responsive to the manipulations of the electronic map, and the rendering module is adapted to update the map and metrics displayed on the display device responsive to the manipulations of the electronic map.

15. The computer program product of claim 11, wherein the template module is adapted to store a plurality of templates, the templates specifying different metrics to display on the map, one or more of the templates are designated as active, metric computation module is adapted to determine computed metrics specified by the active templates, and the rendering module is adapted to display the metrics specified by the active templates.

16. The computer program product of claim 11, wherein the template further specifies how to display a metric and wherein the rendering module displays the metric on the electronic map as specified by the template.

17. The computer program product of claim 16, wherein the rendering module is further adapted to display a map area and a metrics panel on the display device, and to selectively display the metrics in the map area and/or the metrics panel as specified by the template.

18. A computer-implemented method for displaying an electronic map on a display device, comprising:
receiving a template specifying one or more of metrics to display on the electronic map including at least one computed metric that is generated responsive to other metrics;

receiving user input manipulating the template, wherein the manipulations alter the metrics specified by the template;

determining the computed metric specified by the template and responsive to the manipulations of the template;

displaying the electronic map and the metrics specified by the template on the display device; and updating the map and metrics displayed on the display device responsive to the manipulations of the template.

19. The method of claim 18, further comprising:
receiving map data for the electronic map from a map sewer via a network.

20. The method of claim 18, further comprising:
receiving the specified metrics from a metric server via a network.

21. The method of claim 18, further comprising:
receiving user input manipulating the electronic map;
determining the computed metric responsive to the manipulations of the electronic map; and
updating the map and metrics displayed on the display device responsive to the manipulations of the electronic map.

22. A system for enabling dynamic exploration of an interactive map, comprising:
a metrics data storage module for storing a plurality of metrics describing mapped regions;
a template storage module for storing a plurality of templates, each template specifying one or more metrics to display on the electronic map responsive to activation of the template;
an ad serving module for selecting advertisements responsive to at least one of the plurality of metrics and/or templates; and
a communications module adapted to receive requests for ones of the plurality of metrics and to provide the metrics in response thereto, to receive requests for ones of the plurality of templates and provide the templates in response thereto, and to provide the selected advertisements responsive to requests for ones of the plurality of metrics and/or templates.

23. The system of claim 22, wherein the communications module communicates with a client having a mapping engine displaying an interactive map for a region and displaying metrics responsive to an active template, and wherein the communications module receives requests for the metrics and/or templates responsive to interactive exploration of the map by an end-user of the client.

24. The system of claim 22, wherein the ad serving module is adapted to select an advertisement responsive to a value of a metric provided in response to a request.

25. The system of claim 22, wherein the template storage module stores a constructed template specifying one or more metrics to display on the electronic map that is created prior to the user's activation of the template.

26. The system of claim 25, wherein the constructed template specifying one or more metrics to display on the electronic map is designated as "active" when the user requests metrics on the stored template.

27. A mapping engine for displaying an electronic map on a display device, comprising:
a template module for:
receiving a template, the template specifying one or more metrics to display on the electronic map including at least one computed metric that is generated responsive to other metrics, and
storing a plurality of templates, the templates specifying different metrics to display on the map, one or more of the templates are designated as active;
a metric computation module for determining the at least one computed metric specified by the active templates; and
a rendering module for displaying the electronic map and the metrics specified by the active templates on the display device.

28. The mapping engine of claim 27, further comprising:
a map module for receiving map data for the electronic map from a map server via a network.

29. The mapping engine of claim 27, further comprising:
a user interface module for receiving user input manipulating the electronic map displayed by the rendering module;
wherein the metric computation module is adapted to determine the computed metric responsive to the manipulations of the electronic map; and
wherein rendering module is adapted to update the map and metrics displayed on the display device responsive to the manipulations of the electronic map.

30. The mapping engine of claim 27, further comprising:
a user interface module for receiving user input manipulating the template received by the template module, wherein the manipulations alter the metrics specified by the template;
wherein the metric computation module is adapted to determine the computed metric responsive to the manipulations of the template; and
wherein rendering module is adapted to update the map and metrics displayed on the display device responsive to the manipulations of the template.

31. The mapping engine of claim 30, further comprising:
a communications module adapted to provide the manipulated template to a server via a network.

32. The mapping engine of claim 27, further comprising:
a metric module for receiving the metrics from a metrics server via a network.

33. The mapping engine of claim 32, wherein the mapping engine is adapted to execute on a computer, and wherein the metric module is adapted to receive a metric from an end-user of the computer.

34. The mapping engine of claim 33, further comprising:
a communications module adapted to provide the metric received from the end-user to the metrics server via the network.

35. The mapping engine of claim 27, wherein the template further specifies how to display a metric and wherein the rendering module displays the metric on the electronic map as specified by the template.

36. The mapping engine of claim 35, wherein the rendering module is further adapted to display a map area and a metrics panel on the display device, and to selectively display the metrics in the map area and/or the metrics panel as specified by the template.

37. A computer program product having a computer-readable medium having computer program logic embodied therein for displaying an electronic map on a display device, the computer program logic comprising:
a template module for:
receiving a template, the template specifying one or more metrics to display on the electronic map including at least one computed metric that is generated responsive to other metrics, and
storing a plurality of templates, the templates specifying different metrics to display one the map, one or more of the templates are designated as active;
a metric computation module for determining the at least one computed metric specified by the active templates; and
a rendering module for displaying the electronic map and the metrics specified by the active templates on the display device.

38. The computer program product of claim 37, further comprising:
a map module for receiving map data for the electronic map from a map server via a network.

39. The computer program product of claim 37, further comprising: a metric module for receiving the metrics from a metrics server via a network.

40. The computer program product of claim 37, further comprising:
- a user interface module for receiving user input manipulating the electronic map displayed by the rendering module,
- wherein the metric computation module is adapted to dynamically determine the computed metric responsive to the manipulations of the electronic map, and
- wherein rendering module is adapted to update the map and metrics displayed on the display device responsive to the manipulations of the electronic map.

41. The computer program product of claim 37, further comprising:
- a user interface module for receiving user input manipulating at least one of the active templates, wherein the manipulations alter the metrics specified by the template;
- wherein the metric computation module is adapted to determine the computed metric responsive to the manipulations of the at least one of the active templates, and
- wherein rendering module is adapted to update the map and metrics displayed on the display device responsive to the manipulations of the at least one of the active templates.

42. The computer program product of claim 37, wherein the template further specifies how to display a metric and wherein the rendering module displays the metric on the electronic map as specified by the template.

43. The computer program product of claim 42, wherein the rendering module is further adapted to display a map area and a metrics panel on the display device, and to selectively display the metrics in the map area and/or the metrics panel as specified by the template.

* * * * *

UNITED STATES PATENT AND TRADEMARK OFFICE
CERTIFICATE OF CORRECTION

PATENT NO. : 7,616,217 B2
APPLICATION NO. : 11/380304
DATED : November 10, 2009
INVENTOR(S) : Dayan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Nineteenth Day of October, 2010

David J. Kappos
*Director of the United States Patent and Trademark Office*